US007880529B2

(12) United States Patent
Amin (10) Patent No.: US 7,880,529 B2
(45) Date of Patent: Feb. 1, 2011

(54) SYSTEMS, DEVICES, AND METHODS FOR CONTROLLABLY COUPLING QUBITS

(75) Inventor: Mohammad H. Amin, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 251 days.

(21) Appl. No.: 12/238,147

(22) Filed: Sep. 25, 2008

(65) Prior Publication Data

US 2009/0078932 A1   Mar. 26, 2009

Related U.S. Application Data

(60) Provisional application No. 60/975,083, filed on Sep. 25, 2007.

(51) Int. Cl.
*H03K 3/38* (2006.01)

(52) U.S. Cl. ..................................... 327/528

(58) Field of Classification Search .................. 327/528
See application file for complete search history.

(56) References Cited

U.S. PATENT DOCUMENTS

| | | | |
|---|---|---|---|
| 4,051,393 A | 9/1977 | Fulton | 307/306 |
| 4,496,854 A | 1/1985 | Chi et al. | 307/306 |
| 4,937,525 A | 6/1990 | Daalmans | 324/248 |
| 5,128,675 A | 7/1992 | Harada | 341/133 |
| 6,605,822 B1 | 8/2003 | Blais et al. | 257/34 |
| 6,627,916 B2 | 9/2003 | Amin et al. | 257/31 |
| 6,753,546 B2 | 6/2004 | Tzalenchuk et al. | 257/31 |
| 6,838,694 B2 | 1/2005 | Esteve et al. | 257/34 |
| 6,984,846 B2 | 1/2006 | Newns et al. | 257/31 |
| 7,051,393 B2 | 5/2006 | Cox | 15/30 |
| 7,133,888 B2 | 11/2006 | Kohn et al. | 708/446 |
| 7,335,909 B2 | 2/2008 | Amin et al. | 257/34 |
| 7,605,600 B2 | 10/2009 | Harris | 326/1 |
| 7,619,437 B2 | 11/2009 | Thom et al. | 326/5 |
| 7,639,035 B2 | 12/2009 | Berkley | 326/2 |
| 2003/0038285 A1 | 2/2003 | Amin et al. | 257/31 |
| 2003/0071258 A1 | 4/2003 | Zagoskin et al. | 257/31 |
| 2003/0224753 A1 | 12/2003 | Bremond et al. | 455/339 |
| 2004/0016918 A1 | 1/2004 | Amin et al. | 257/14 |
| 2005/0001209 A1 | 1/2005 | Hilton et al. | 257/20 |
| 2005/0082519 A1 | 4/2005 | Amin et al. | 257/13 |

(Continued)

FOREIGN PATENT DOCUMENTS

CA   2386426   5/2001

(Continued)

OTHER PUBLICATIONS

"A High-Level Look at Optimization: Past, Present and Future," e-Optimization.Community, May 2000, pp. 1-5.

(Continued)

*Primary Examiner*—Evan Pert
(74) *Attorney, Agent, or Firm*—Seed IP Law Group PLLC (57) ABSTRACT

A coupling system may include first and second magnetic flux inductors communicatively coupled to a Josephson junction of an rf SQUID. The coupling system may allow transverse coupling between qubits. A superconducting processor may include at least one of the coupling systems and two or more qubits. A method may include providing first, second and third coupling structure to control the coupling system.

27 Claims, 3 Drawing Sheets

U.S. PATENT DOCUMENTS

| | | | |
|---|---|---|---|
| 2005/0250651 A1 | 11/2005 | Amin et al. | 505/846 |
| 2005/0256007 A1 | 11/2005 | Amin et al. | 505/170 |
| 2006/0097747 A1 | 5/2006 | Amin | 326/6 |
| 2006/0147154 A1 | 7/2006 | Thom et al. | 385/37 |
| 2006/0225165 A1 | 10/2006 | Maassen van den Brink et al. | 977/933 |
| 2007/0180586 A1 | 8/2007 | Amin | 977/755 |
| 2008/0238531 A1 | 10/2008 | Harris | 327/528 |
| 2008/0258753 A1 | 10/2008 | Harris | 326/4 |
| 2008/0274898 A1 | 11/2008 | Johnson et al. | 505/190 |
| 2009/0192041 A1 | 7/2009 | Johansson et al. | 505/170 |

FOREIGN PATENT DOCUMENTS

| | | |
|---|---|---|
| WO | 2004/102470 | 11/2004 |
| WO | 2005/093649 | 10/2005 |
| WO | 2006/024939 | 3/2006 |

OTHER PUBLICATIONS

Allen et al., "Blue Gene: A Vision for Protein Science Using a Petaflop Supercomputer," *IBM Systems Journal* 40(2):310-327, 2001.

Amin et al., "Decoherence in Adiabatic Quantum Computation," arXiv:0708.0384v1 [cond-mat.mes-hall], pp. 1-4, Aug. 2, 2007.

Amin M.H., "Systems, Devices and Methods for Controllably Coupling Qubits," U.S. Appl. No. 60/975,083, filed Sep. 25, 2007.

Averin et al., "Variable Electrostatic Transformer: Controllable Coupling of Two Charge Qubits," *Physical Review Letters* 91(5):057003-1-057003-4, Aug. 1, 2003.

Berkley et al., "Scalable Superconducting Flux Digital-to-Analog Conversion Using a Superconducting Inductor Ladder Circuit," U.S. Appl. No. 60/917,884, filed May 14, 2007.

Berkley et al., "Systems, Methods and Apparatus for Local Programming of Quantum Processor Elements," U.S. Appl. No. 11/950,276, filed Dec. 4, 2007.

Berkley, A.J., "Architecture for Local Programming of Quantum Processor Elements Using Latching Qubits," U.S. Appl. No. 12/109,847, filed Apr. 25, 2008.

Biamonte et al., "Physical Implementations for a Universal Quantum Computer and Related Coupling Devices," U.S. Appl. No. 60/910,445, filed Apr. 5, 2007.

Biamonte et al., "Realizable Hamiltonians for Universal Adiabatic Quantum Computers," arXiv:0704.1287v1 [quant-ph], pp. 1-4, Apr. 10, 2007.

Biamonte et al., "Physical Realizations of a Universal Adiabatic Quantum Computer," U.S. Appl. No. 12/098,348, filed Apr. 4, 2008.

Blatter et al., "Design aspects of superconducting-phase quantum bits," *Physical Review B* 63:174511-1-174511-9, 2001.

Bocko et al., "Prospects for Quantum Coherent Computation Using Superconducting Electronics," *IEEE Transactions on Applied Superconductivity* 7(2):3638-3641, 1997.

Brennen et al., "Why Should Anyone Care About Computing with Anyons?," arXiv:0704.2241v1, pp. 1-19, Apr. 18, 2007.

Bunyk et al., "Systems, Methods and Apparatus for Digital-to-Analog Conversion of Superconducting Magentic Flux Signals," U.S. Appl. No. 12/120,354, filed May 14, 2008.

Butcher, "Advances in Persistent-Current Qubit Research: Inductively Coupled Qubits and Novel Biasing Methods," Graduate Thesis, Delft University of Technology, 52 pages, Jan. 10, 2002.

Choi, V., "Systems, Devices, and Methods for Analog Processing," U.S. Appl. No. 60/986,554, filed Nov. 8, 2007.

Choudhury, *Handbook of Microlithography, Micromachining and Microfabrication* vol. 1: *Microlithography*, The International Society for Optical Engineering, Bellingham, WA, 1999.

Clarke et al., "Quiet Readout of Superconducting Flux States," *Physica Scripta*. T102:173-177, 2002.

Cosmelli et al., "Controllable Flux Coupling for the Integration of Flux Qubits," arXiv:cond-mat/0403690v1, pp. 1-10, Mar. 29, 2004.

Deutsch, "Quantum theory, the Church-Turing principle and the universal quantum computer," Appeared in *Proceedings of the Royal Society of London A 400*: 97-117, 1985.

Dolan et al., "Optimization on the NEOS Server," from *SIAM News* 35(6): 1-5, Jul./Aug. 2002.

Farhi et al., "Quantum Adiabatic Evolution Algorithms versus Simulated Annealing," MIT-CTP #3228, arXiv:quant-ph/0201031 v1, pp. 1-16, Jan. 8, 2002.

Feynman, "Simulating Physics with Computers," *International Journal of Theoretical Physics* 21(6/7):467-488, 1982.

Filippov et al., "Tunable Transformer for Qubits Based on Flux States," *IEEE Transactions on Applied Superconductivity* 13(2): 1-4, Jun. 2003.

Fourer et al., "Optimization as an Internet Resource," *Interfaces* 31(2):130-150, Mar./Apr. 2001.

Friedman et al., "Quantum superposition of distinct macroscopic states," *Nature* 406:43-46, Jul. 6, 2000.

Fritzsch et al., SNS and SIS Josephson junctions with dimensions down to the sub-µm region prepared by an unified technology, *Supercond. Sci. Tech.* 12: 880-882, 1999.

Ghiu et al., "Asymmetric two-output quantum processor in any dimension," arXiv:quant-ph/0610138v1, pp. 1-8, Oct. 17, 2006.

Harris et al., "Sign and Magnitude Tunable Coupler for Superconducting Flux Qubits," arXiv:cond-mat/0608253 v1, Aug. 11, 2006.

Harris, "Systems, Devices, and Methods for Controllably Coupling Qubits," Office Action mailed Sep. 3, 2009 for U.S. Appl. No. 12/017,995, 11 pages.

Harris, "Systems, Devices, and Methods for Controllably Coupling Qubits," Preliminary Amendment filed Jun. 18, 2009 for U.S. Appl. No. 12/017,995, 7 pages.

Harris, R.G., "Systems, Devices, and Methods for Controllably Coupling Qubits," U.S. Appl. No. 12/017,995, filed Jan. 22, 2008.

Hillery et al., "Approximate programmable quantum processors," arXiv:quant-ph/0510161v1, pp. 1-7, Oct. 20, 2005.

Hioe, *Quantum Flux Parametron—A Single Quantum Flux Superconducting Logic Device*, World Scientific Publishing Co. Pte. Ltd., Singapore, pp. 23-43, 1991.

Il'ichev et al., "Continuous Monitoring of Rabi Oscillations in a Josephson Flux Qubit," *Physical Review Letters* 91(9):097906-1-097906-4, week ending Aug. 29, 2003.

Inokuchi et al., "Analog Computation using Quantum-Flux Parametron Devices," *Physica C*, 357-360, pp. 1618-1621, Department of Electrical Engineering, Hokkaido University, Kita 13, Nishi 8, Sapporo 060-8628, Japan, Jan. 12, 2001.

International Search Report, mailed Jan. 21, 2009, for PCT/CA2008/001778, 3 pages.

International Search Report, mailed Jul. 18, 2008, for PCT/CA2008/000841, 4 pages.

International Search Report, mailed Jul. 25, 2008, for PCT/CA2008/000660, 4 pages.

International Search Report, mailed May 20, 2008, for PCT/CA2008/000138, 3 pages.

Ioffe et al., "Environmentally Decoupled sds-wave Josephson Junctions for Quantum Computing," *Nature* 398:679-681, 1999.

Johnson et al., "Systems, Devices, and Methods for Controllably Coupling Qubits," Office Action mailed Jul. 2, 2009, for U.S. Appl. No. 12/113,753, 9 pages.

Johnson et al., "Systems, Devices, and Methods for Controllably Coupling Qubits," Response filed Aug. 18, 2009, for U.S. Appl. No. 12/113,753, 4 pages.

Johnson et al., "Systems, Devices, and Methods for Controllably Coupling Qubits," Office Action mailed Nov. 17, 2009, for U.S. Appl. No. 12/113,753, 9 pages.

Johnson et al., "Systems, Devices, and Methods for Controllably Coupling Qubits," Amendment filed Feb. 12, 2010, for U.S. Appl. No. 12/113,753, 9 pages.

Kaiser et al., "Coherent Atomic Matter Waves: Proceedings of the Les Houches Summer School, Session LXXII in 1999," Springer-Verlag, New York, ISBN 286883499X, pp. 184-188, 294-295, 302-303.

Koch et al., "Model for 1/F Flux Noise in SQUIDs and Qubits," *Physical Review Letters* 98(26), 16 pages, 2007.

Levinson, *Principles of Lithography*, The International Society for Optical Engineering, Bellingham, WA, 2001.

Levitov et al., "Quantum spin chains and Majorana states in arrays of coupled qubits," arXiv:cond-mat/0108266v2, pp. 1-7, Aug. 19, 2001.

Maassen van den Brink et al., "Mediated tunable coupling of flux qubits," *New Journal of Physics* 7:1-18, 2005.

Madou, *Fundamentals of Microfabrication*, Second Edition, CRC Press LLC, Boca Raton, Florida, 2002.

Maibaum et al., "Systems, Methods and Apparatus for a Differential Superconducting Flux Digital-to-Analog Converter," U.S. Appl. No. 60/975,487, filed Sep. 26, 2007.

Maibaum et al., "Systems, Devices, and Methods for Analog Processing," U.S. Appl. No. 61/039,710, filed Mar. 26, 2008.

Majer et al., "Spectroscopy on Two Coupled Flux Qubits", arXiv:cond-mat/0308192 v1, Aug. 10, 2003.

Makhlin et al., "Quantum-State Engineering with Josephson-Junction Devices," *Reviews of Modern Physics* 73(2):357-400, Apr. 2001.

Mc Hugh et al., "A quantum computer using a trapped-ion spin molecule and microwave radiation," arXiv:quant-ph/0310015v2, pp. 1-9, Apr. 13, 2004.

Mooij et al., "Josephson Persistent-Current Qubit," *Science 285*: 1036-1039, Aug. 13, 1999.

Nielsen, "Cluster-State Quantum Computation," arXiv:quant-ph/0504097v2, pp. 1-15, Jul. 1, 2005.

Nielsen et al., *Quantum Computation and Quantum Information*, Cambridge University Press, Cambridge, 2000, "7 Quantum Computers: Physical Realization," pp. 277-352.

Nielsen et al., *Quantum Computation and Quantum Information*, Cambridge University Press, Cambridge, 2000, "7.8 Other implementation schemes," pp. 343-345.

Orlando et al., "Superconducting Persistent-Current Qubit," *Physical Review B 60*(22):15 398-15 413, Dec. 1, 1999.

Paternostro et al., "Quantum-State Transfer in Imperfect Artificial Spin Networks," *Physical Review A 71*(4):042311, 2005.

Plourde et al., "Entangling flux qubits with a bipolar dynamic inductance," *Physical Review B 70*(140501-R): 1-4, 2004.

Rose et al., "Systems, Devices, and Methods for Interconnected Processor Topology," U.S. Appl. No. 12/013,192, filed Jan. 11, 2008.

Rose, G., "Analog Processor with Quantum Devices," U.S. Appl. No. 60/638,600, filed Dec. 23, 2004.

Ryan et al., "Characterization of complex quantum dynamics with a scalable NMR information processor," arXiv:quant-ph/0506085v2, pp. 1-4, Feb. 13, 2006.

Shirts et al., "Computing: Screen Savers of the Word Unite!," *Science Online 290*(5498): 1903-1904, Dec. 8, 2000.

Shnirman et al., "Low- and High-Frequency Noise from Coherent Two-Level Systems," *Physical Review PRL 94*(12) 4 pages, Apr. 1, 2005.

Shoji et al., "New fabrication process for Josephson tunnel junctions with (niobium nitride, niobium) double-layered electrodes," *Appl. Phys. Lett. 41*(11): 1097-1099, Dec. 1, 1982.

Shor, "Introduction to Quantum Algorithms," AT&T Labs—Research, arXiv:quant-ph/0005003 v2, pp. 1-17, Jul. 6, 2001.

Thaker et al., "Quantum Memory Hierarchies: Efficient Designs to Match Available Parallelism in Quantum Computing," arXiv:quant-ph/0604070v1, 12 pages, Apr. 10, 2006.

Van Zant, *Microchip Fabrication*, Fourth Edition, McGraw-Hill, New York, 2000.

Vlasov, "Von Neumann Quantum Processors," arXiv:quant-ph/0311196v1, pp. 1-8, Nov. 27, 2003.

Williams et al., *Explorations in Quantum Computing*, Springer, New York, Dec. 12, 1997, Chapter 11, "How to Make a Quantum Computer," pp. 241-265.

Written Opinion, mailed Jul. 18, 2008, for PCT/CA2008/000841, 5 pages.

Written Opinion, mailed Jul. 25, 2008, for PCT/CA2008/000660, 2 pages.

SYSTEMS, DEVICES, AND METHODS FOR CONTROLLABLY COUPLING QUBITS

CROSS-REFERENCE TO RELATED APPLICATIONS

This application claims benefit under 35 U.S.C. 119(e) of U.S. Provisional Patent Application Ser. No. 60/975,083, filed Sep. 25, 2007, entitled "Systems, Devices, and Methods for Controllably Coupling Qubits", which is incorporated herein by reference in its entirety.

BACKGROUND

1. Field

The present systems, devices and methods generally relate to superconducting computing, for example analog or quantum computing employing processors that operate at superconducting temperatures.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi et al., "Quantum Adiabatic Evolution Algorithms versus Simulated Annealing" arXiv.org:quant-ph/0201031 (2002), pp 1-24.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. Pat. No. 7,335,909.

Computational Complexity Theory

In computer science, computational complexity theory is the branch of the theory of computation that studies the resources, or cost, of the computation required to solve a given computational problem. This cost is usually measured in terms of abstract parameters such as time and space, called computational resources. Time represents the number of steps required to solve a problem and space represents the quantity of information storage required or how much memory is required.

Computational complexity theory classifies computational problems into complexity classes. The number of complexity classes is ever changing, as new ones are defined and existing ones merge through the contributions of computer scientists. The complexity classes of decision problems include:

1. P—The complexity class containing decision problems that can be solved by a deterministic UTM using a polynomial amount of computation time;

2. NP ("Non-deterministic Polynomial time")—The set of decision problems solvable in polynomial time on a non-deterministic UTM. Equivalently, it is the set of problems that can be "verified" by a deterministic UTM in polynomial time;

3. NP-hard (Nondeterministic Polynomial-time hard)—A problem H is in the class NP-hard if and only if there is an NP-complete problem L that is polynomial time Turing-reducible to H. That is to say, L can be solved in polynomial time by an oracle machine with an oracle for H;

4. NP-complete—A decision problem C is NP-complete if it is complete for NP, meaning that:

(a) it is in NP and (b) it is NP-hard, i.e., every other problem in NP is reducible to it. "Reducible" means that for every problem L, there is a polynomial-time many-one reduction, a deterministic algorithm which transforms instances I ∈ L into instances c ∈ C, such that the answer to c is YES if and only if the answer to I is YES. To prove that an NP problem A is in fact an NP-complete problem it is sufficient to show that an already known NP-complete problem reduces to A.

Decision problems have binary outcomes. Problems in NP are computation problems for which there exists a polynomial time verification. That is, it takes no more than polynomial time (class P) in the size of the problem to verify a potential solution. It may take more than polynomial time, however, to find a potential solution. NP-hard problems are at least as hard as any problem in NP.

Optimization problems are problems for which one or more objective functions are minimized or maximized over a set of variables, sometimes subject to a set of constraints. For example, the Traveling Salesman Problem ("TSP") is an optimization problem where an objective function representing, for example, distance or cost, must be optimized to find an itinerary, which is encoded in a set of variables representing the optimized solution to the problem. For example, given a list of locations, the problem may consist of finding the shortest route that visits all locations exactly once. Other examples of optimization problems include Maximum Independent Set, integer programming, constraint optimization, factoring, prediction modeling, and k-SAT. These problems are abstractions of many real-world optimization problems, such as operations research, financial portfolio selection, scheduling, supply management, circuit design, and travel route optimization. Many large-scale decision-based optimization problems are NP-hard. See e.g., "*A High-Level Look at Optimization: Past, Present, and Future*" e-Optimization.com, 2000.

Simulation problems typically deal with the simulation of one system by another system, usually over a period of time. For example, computer simulations can be made of business processes, ecological habitats, protein folding, molecular ground states, quantum systems, and the like. Such problems often include many different entities with complex inter-relationships and behavioral rules. In Feynman it was suggested that a quantum system could be used to simulate some physical systems more efficiently than a UTM.

Many optimization and simulation problems are not solvable using UTMs. Because of this limitation, there is need in the art for computational devices capable of solving computational problems beyond the scope of UTMs. In the field of protein folding, for example, grid computing systems and supercomputers have been used to try to simulate large protein systems. See Shirts et al., 2000, *Science* 290, pp. 1903-1904, and Allen et al., 2001, *IBM Systems Journal* 40, p. 310. The NEOS solver is an online network solver for optimization problems, where a user submits an optimization problem, selects an algorithm to solve it, and then a central server directs the problem to a computer in the network capable of running the selected algorithm. See e.g., Dolan et al., 2002, *SIAM News Vol.* 35, p. 6. Other digital computer-based systems and methods for solving optimization problems can be found, for example, in Fourer et al., 2001, *Interfaces* 31, pp. 130-150. All these methods are limited, however, by the fact they utilize digital computers, which are UTMs, and accordingly, are subject to the limits of classical computing that impose unfavorable scaling between problem size and solution time.

Persistent Current ZZ Coupler

Figure 1:
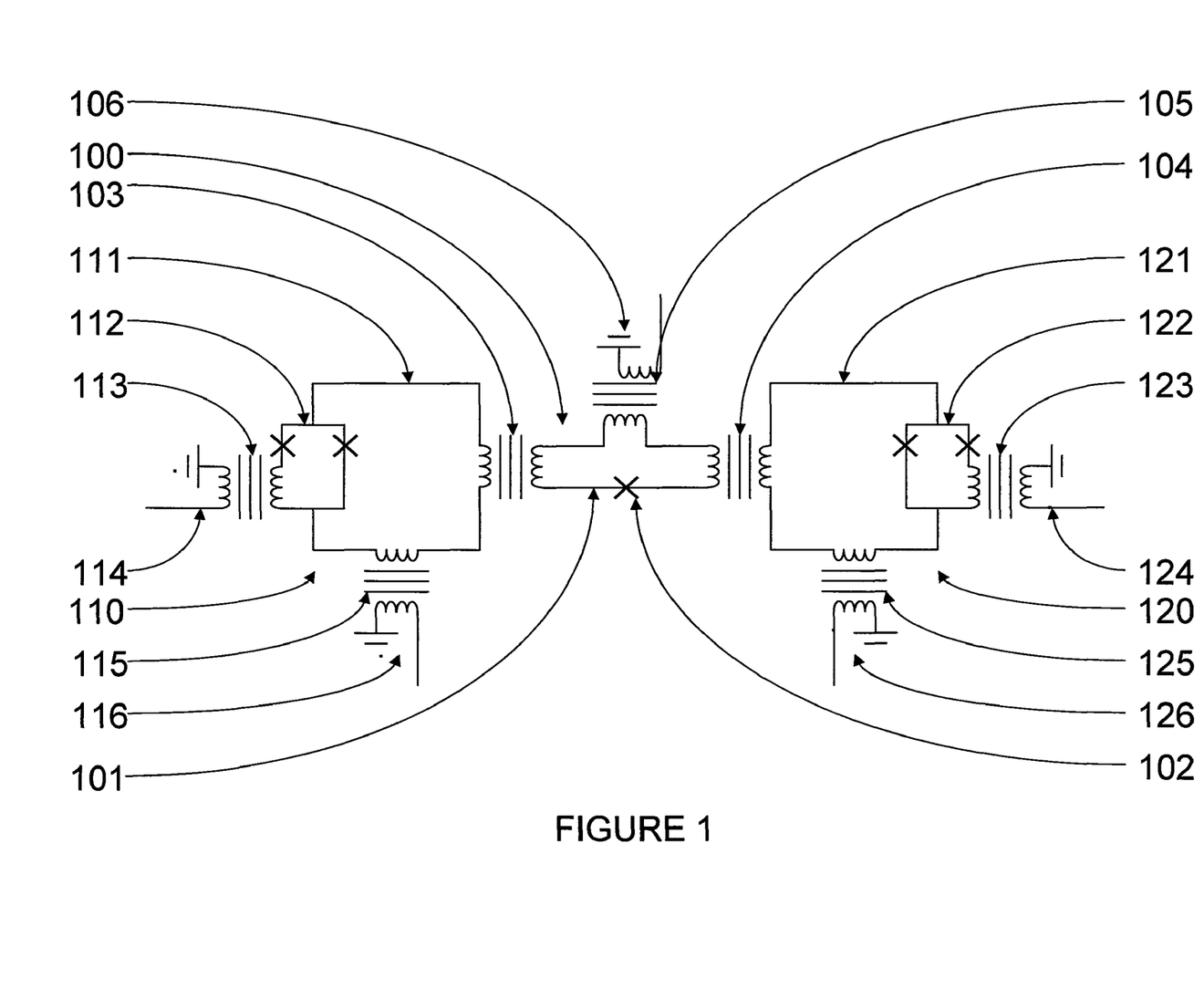
FIG. 1 is a schematic diagram of a controllable ZZ coupler.

In FIG. 1 shows schematic diagram of a controllable ZZ coupler 100. Coupler 100 includes a loop 101 of superconducting material interrupted by a single Josephson junction 102 and is used to couple a first qubit 110 and a second qubit 120. Qubit 110 includes a loop 111 of superconducting material interrupted by a compound Josephson junction 112 and is coupled to coupler 100 through the exchange of flux 103 between coupler 100 and qubit 110. Loop 111 is threaded by flux 115 created by electrical current flowing through a magnetic flux inductor 116. Flux 115 controls the energy bias of qubit 110. Compound Josephson junction 112 is threaded by flux 113 created by electrical current flowing through magnetic flux inductor 114. Flux 113 controls the transverse term $\Delta_1$ of qubit 110. Qubit 120 includes a loop 121 of superconducting material interrupted by a compound Josephson junction 122 and is coupled to coupler 100 through the exchange of flux 104 between coupler 100 and qubit 120. The loop 121 is threaded by flux 125 created by electrical current flowing through magnetic flux inductor 126. Flux 125 controls the energy bias of qubit 120. Compound Josephson junction 122 is threaded by flux 123 created by electrical current flowing through magnetic flux inductor 124. Flux 123 controls the transverse term $\Delta_2$ of qubit 120. Loop 101 is threaded by flux 105 created by electrical current flowing through magnetic flux inductor 106.

Flux 105 produced by magnetic flux inductor 106 threads loop 101 and controls the state of coupler 100. Coupler 100 is capable of producing a zero coupling between qubit 110 and qubit 120, an anti-ferromagnetic coupling between qubit 110 and qubit 120, and a ferromagnetic coupling between qubit 110 and qubit 120.

It may be desirable to weaken non-adiabatic couplings produced by coupler 100 so that adiabatic couplings (e.g., $\sigma_z^1 \sigma_z^2$ interactions such as anti-ferromagnetic coupling between qubit 110 and qubit 120 and ferromagnetic coupling between qubit 110 and qubit 120) dominate. For further discussion of adiabatic couplings, see e.g., Hutter et al., arXiv: cond-mat/0602086 (2006).

The Hamiltonians which coupler 100 is capable of embedding allow for diagonalized ZZ coupling interactions (e.g., $\sigma_z^1 \sigma_z^2$ interactions) and do not allow for the production of off-diagonal YY couplings ($\sigma_y^1 \sigma_y^2$ interactions). The Hamiltonian H for coupler 100 is:

$$H = \sum_{i=1,2} h_i \sigma_z^i + J_{1,2}^{ZZ} \sigma_z^1 \sigma_z^2,$$

where 1 and 2 represent qubit 110 and qubit 120 respectively, $h_1$ is the energy bias of qubit 110 and is controllable by adjusting the amount of flux 115 threading loop 111, $h_2$ is the energy bias of qubit 120 and is controllable by adjusting the amount of flux 125 threading loop 121, $\sigma_z^1$ is the z-Pauli matrix of qubit 110, $\sigma_z^2$ is the z-Pauli matrix of qubit 120, and $J_{1,2}^{ZZ}$ is the diagonal coupling coefficient between qubit 110 and qubit 120 and is controllable by adjusting the amount of flux 105 threading loop 101. The parameters $\Delta_1$ and $\Delta_2$ are the flux tunneling amplitude terms of qubit 110 and qubit 120 respectively. The transverse terms, $\Delta_1$ and $\Delta_2$, are respectively controllable by adjusting the amount of flux 113 threading compound Josephson junction 112 and the amount of flux 123 threading compound Josephson junction 122. $\Delta_1$ and $\Delta_2$ are suppressed during the operation of coupler 100 and effectively have a value of zero and may be ignored within the Hamiltonian H of coupler 100.

For further discussion of coupler 100, see e.g., Harris et al., "Sign-and Magnitude-Tunable Coupler for Superconducting Flux Qubits", Physical Review Letters 98 (2007) 177001, and van der Brink et al., "Mediated tunable coupling of flux qubits," New Journal of Physics 7 (2005) 230.

Zero-Persistent Current ZZ Coupler

Figure 2:
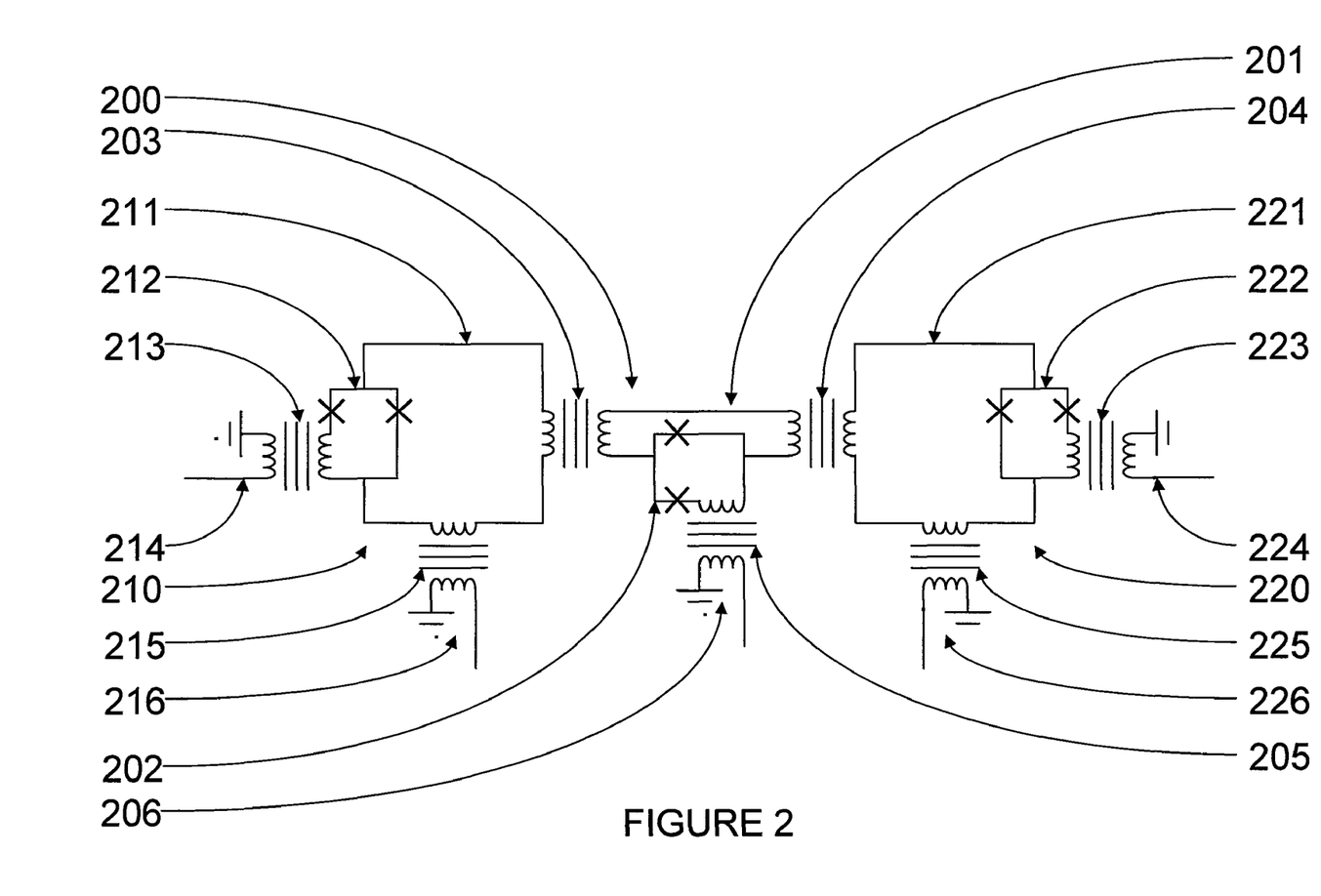
FIG. 2 is a schematic diagram of a controllable ZZ coupler.

FIG. 2 is a schematic diagram of controllable ZZ coupler 200 is used to inductively couple a first qubit 210 and a second qubit 220. The coupler 200 is comprised of a loop 201 of superconducting material interrupted by compound Josephson junction 202. Qubit 210 is comprised of a loop 211 of superconducting material interrupted by compound Josephson junction 212 and is coupled to coupler 200 through the exchange of flux 203 between coupler 200 and qubit 210. Loop 211 is threaded by flux 215 created by electrical current flowing through a magnetic flux inductor 216. Flux 215 controls the energy bias of qubit 210. Compound Josephson junction 212 is threaded by flux 213 created by electrical current flowing through a magnetic flux inductor 214. Flux 213 controls the transverse term $\Delta_1$ of qubit 210. Qubit 220 is comprised of a loop 221 of superconducting material interrupted by a compound Josephson junction 222 and is coupled to coupler 200 through the exchange of flux 204 between coupler 200 and qubit 220. Loop 221 is threaded by flux 225 created by electrical current flowing through a magnetic flux inductor 226. Flux 225 controls the energy bias of qubit 220. Compound Josephson junction 222 is threaded by flux 223 created by electrical current flowing through a magnetic flux inductor 224. Flux 223 controls the transverse term $\Delta_2$ of qubit 220. Compound Josephson junction 202 is threaded by flux 205 created by current flowing through a magnetic flux inductor 206. Flux 205 produced by magnetic flux inductor 206 threads compound Josephson junction 202 of coupler 200 and controls the state of coupler 200.

Coupler 200 is capable of producing a zero coupling between qubit 210 and qubit 220. To produce the zero coupling between qubit 210 and qubit 220, the amount of flux 205 threading compound Josephson junction 202 is adjusted to be about $(n+\frac{1}{2})\phi_0$, wherein n is an integer. Coupler 200 is capable of producing an anti-ferromagnetic coupling between qubit 210 and qubit 220. To produce such a coupling between qubit 210 and qubit 220, the amount of flux 205 threading compound Josephson junction 202 is adjusted to be about $(2n)\phi_0$, wherein n is an integer. Coupler 200 is capable of producing a ferromagnetic coupling between qubit 210 and qubit 220. To produce such a coupling between qubit 210 and qubit 220, the amount of flux 205 threading compound Josephson junction 202 is adjusted to be about $(2n+1)\phi_0$, wherein n is an integer. An amount of flux (not shown in FIG. 2) threading the loop 201 can be applied to render the net value of flux threading the loop 201 to be about zero. Where the net value of flux threading the loop 201 is about zero a minimum amount of persistent current will be present within the loop 201 during states produced by coupler 200.

It may be desirable to weaken non-adiabatic couplings produced by coupler 200 so that adiabatic couplings (e.g., $\sigma_z^1 \sigma_z^2$ interactions such as anti-ferromagnetic coupling between qubit 210 and qubit 220 and ferromagnetic coupling between qubit 210 and qubit 220) dominate. For further discussion of adiabatic couplings, see e.g., Hutter et al., arXiv: cond-mat/0602086 (2006).

The Hamiltonians which coupler 200 is capable of embedding allow for diagonalized ZZ coupling interactions (e.g., $\sigma_z^1 \sigma_z^2$ interactions) and do not allow for the production of off-diagonal YY couplings (e.g., $\sigma_y^1 \sigma_y^1$ interactions). The Hamiltonian H for coupler 200 is:

$$H = \sum_{i=1,2} h_i \sigma_z^i + J_{1,2}^{ZZ} \sigma_z^1 \sigma_z^2,$$

where 1 and 2 represent qubit 210 and qubit 220 respectively, $h_1$ is the energy bias of qubit 210 and is controllable by adjusting the amount of flux 215 threading the loop 211, $h_2$ is the energy bias of qubit 220 and is controllable by adjusting the amount of flux 225 threading the loop 221, $\sigma_z^1$ is the z-Pauli matrix of qubit 210, $\sigma_z^2$ is the z-Pauli matrix of qubit 220, and $J_{1,2}^{ZZ}$ is the diagonal coupling coefficient between qubit 210 and qubit 220 and is controllable by adjusting the amount of flux 205 threading compound Josephson junction 202. The parameters $\Delta_1$ and $\Delta_2$ are the flux tunneling amplitude terms of qubit 210 and qubit 220 respectively. The transverse terms, $\Delta_1$ and $\Delta_2$, are respectively controllable by adjusting the amount of flux 213 threading compound Josephson junction 212 and the amount of flux 223 threading compound Josephson junction 222. $\Delta_1$ and $\Delta_2$ are suppressed during the operation of coupler 200 and effectively have a value of about zero and may therefore ignored within the Hamiltonian H of coupler 200.

For further discussion of persistent current couplers, see e.g., U.S. patent Ser. No. 12/017,995.

BRIEF SUMMARY

A coupling system may be summarized as including an rf SQUID having a loop of superconducting material interrupted by a compound Josephson junction; a first magnetic flux inductor coupled to the compound Josephson junction and capable of controlling a $\beta_L$ parameter of the coupling system; a second magnetic flux inductor coupled to the loop of superconducting material; and a first coupling structure coupling the rf SQUID to a first qubit; a second coupling structure coupling the rf SQUID to a second qubit; and wherein the coupling system is operated such that the $\beta_L$ parameter is greater than 1.

At least one of the first qubit and the second qubit may be a superconducting flux qubit. The first magnetic flux inductor and the second magnetic flux inductor may control a coupling state of the coupling device. The coupling state of the coupling device may be one of anti-ferromagnetic coupling, ferromagnetic coupling, transverse coupling and zero coupling. The $\beta_L$ parameter may be controlled by adjusting the amount of flux produced by the first magnetic flux inductor. The transverse coupling state may be in a flux basis.

At least one embodiment may be summarized as a method of controllably coupling a first qubit to a second qubit using an rf SQUID having a loop of superconducting material interrupted by a compound Josephson junction including coupling the first qubit to the rf SQUID; coupling the second qubit to the rf SQUID; coupling a first magnetic flux inductor to the compound Josephson junction; coupling a second magnetic flux inductor to the loop or superconducting material; adjusting a first amount of flux, produced by the first magnetic flux inductor, threading the compound Josephson junction; and adjusting a second amount of flux, produced by the second magnetic flux inductor, that threads the loop of superconducting material, such that the first qubit is transversely coupled to the second qubit.

At least one of the first qubit and the second qubit may be a superconducting flux qubit. Coupling the first qubit to the rf SQUID may include threading magnetic flux produced by current flowing in the first qubit into the loop of superconducting material; and threading magnetic flux produced by current flowing in the loop of superconducting material into the first qubit. Coupling the second qubit to the rf SQUID may include threading magnetic flux produced by current flowing in the second qubit into the loop of superconducting material; and threading magnetic flux produced by current flowing in the loop of superconducting material into the second qubit. Coupling a first magnetic flux inductor to the compound Josephson junction may include threading magnetic flux produced by current flowing through the first magnetic flux inductor into the compound Josephson junction; and wherein coupling a second magnetic flux inductor to the loop of superconducting material comprises threading magnetic flux produced by current flowing through the second magnetic flux inductor into the loop of superconducting material. Adjusting the amount of flux, produced by the first magnetic flux inductor, threading the compound Josephson junction may include at least one of passing more current through the first magnetic flux inductor or passing less current through the first magnetic flux inductor; and adjusting the amount of flux, produced by the second magnetic flux inductor, threading the loop of superconducting material may include at least one of passing more current through the second magnetic flux inductor or passing less current through the second magnetic flux inductor. Adjusting the amount of flux, produced by the first magnetic flux inductor, threading the compound Josephson junction and adjusting the amount of flux, produced by the second magnetic flux inductor, threading the loop of superconducting material may result in coupling the first qubit and the second qubit with at least one of anti-ferromagnetically coupling, ferromagnetically coupling, transverse coupling and zero coupling. The transverse coupling state may be in a flux basis.

A coupling system may be summarized as including an rf SQUID having a loop of superconducting material interrupted by a compound Josephson junction and a $\beta_L$ parameter; a first magnetic flux inductor configured to selectively provide a first magnetic flux inductor mutual inductance coupling the first magnetic flux inductor to the compound Josephson junction, wherein the first magnetic flux inductor adjusts the $\beta_L$ parameter to be greater than one; and a second magnetic flux inductor configured to selectively provide a second magnetic flux inductor mutual inductance coupling the second magnetic flux inductor to the loop or superconducting material, wherein the loop of superconducting material positioned with respect to a first qubit to provide a first mutual inductance coupling the rf SQUID to the first qubit, and wherein the loop of superconducting material positioned with respect to a second qubit to provide a second mutual inductance coupling rf SQUID to the second qubit.

At least one embodiment may be summarized as a superconducting processor including a first qubit; a second qubit; an rf SQUID having a loop of superconducting material interrupted by a compound Josephson junction and a $\beta_L$ parameter; a first magnetic flux means for selectively providing inductance coupling the first magnetic flux means to the compound Josephson junction, wherein the first magnetic flux means adjusts the $\beta_L$ parameter to be greater than one; and a second magnetic flux means for selectively providing inductance coupling the second magnetic flux means to the loop of superconducting material, wherein the loop of superconducting material is configured to provide a first mutual inductance coupling the rf SQUID to the first qubit and to provide a second mutual inductance coupling the rf SQUID to the second qubit.

At least one of the first qubit and the second qubit may be a superconducting flux qubit. The first magnetic flux means may include a first magnetic flux inductor configured to selectively provide a third mutual inductance coupling the first magnetic flux inductor to the compound Josephson junction. The second magnetic flux means may include a second magnetic flux inductor configured to selectively provide a fourth mutual inductance coupling the second magnetic flux inductor to the loop of superconducting material.

A method of controllably coupling a first qubit to a second qubit using an rf SQUID having a loop of superconducting material interrupted by a compound Josephson junction and a $\beta_L$ parameter, may be summarized as including coupling the first qubit to the rf SQUID; coupling the second qubit to the rf SQUID; coupling a first magnetic flux inductor to the compound Josephson junction; coupling a second magnetic flux inductor to the loop or superconducting material; adjusting a first amount of flux, produced by the second magnetic flux inductor, threading the compound Josephson junction, wherein the first amount of flux adjusts the $\beta_L$ parameter to be greater than one; and adjusting a second amount of flux, produced by the second magnetic flux inductor, threading the loop of superconducting material.

At least one of the first qubit and the second qubit may be a superconducting flux qubit. Coupling the first qubit to the rf SQUID may include threading magnetic flux produced by current flowing in the first qubit into the loop of superconducting material; and threading magnetic flux produced by current flowing in the loop of superconducting material into the first qubit. Coupling the second qubit to the rf SQUID may include threading magnetic flux produced by current flowing in the second qubit into the loop of superconducting material; and threading magnetic flux produced by current flowing in the loop of superconducting material into the second qubit. Coupling a first magnetic flux inductor to the compound Josephson junction may include threading magnetic flux produced by current flowing through the first magnetic flux inductor into the compound Josephson junction; and wherein coupling a second magnetic flux inductor to the loop of superconducting material may include threading magnetic flux produced by current flowing through the second magnetic flux inductor into the loop of superconducting material. Adjusting the amount of flux, produced by the first magnetic flux inductor, threading the compound Josephson junction may comprise at least one of passing more current through the first magnetic flux inductor or passing less current through the first magnetic flux inductor; and adjusting the amount of flux, produced by the second magnetic flux inductor, threading the loop of superconducting material may comprise at least one of passing more current through the second magnetic flux inductor or passing less current through the second magnetic flux inductor. Adjusting the amount of flux, produced by the first magnetic flux inductor, threading the compound Josephson junction and adjusting the amount of flux, produced by the second magnetic flux inductor, threading the loop of superconducting material may result in least one of antiferromagnetically coupling, ferromagnetically coupling, transverse coupling and zero coupling. The transverse coupling state may be in a flux basis.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Transverse coupling between two qubits may be needed to solve QMA-complete problems. See e.g., Kempe et al., arXiv:quant-ph/0406180 (2004); and Oliveira et al., arXiv:quant-ph/0504050 (2005). For optimization problems, including a YY coupling with the initial Hamiltonian may change the quantum phase transition from first order to second order thereby making computational times shorter. See e.g., Schutzhold et al., arXiv:quant-ph/0608017 (2006); and Schaller et al., arXiv:0708.1882 (2007). For a discussion of a method for the controlled transverse YY coupling of two Josephson charge qubits by means of a variable electrostatic transformer, see e.g., Averin et al., Physical Review Letters 91, 057003 (2003).

Figure 3:
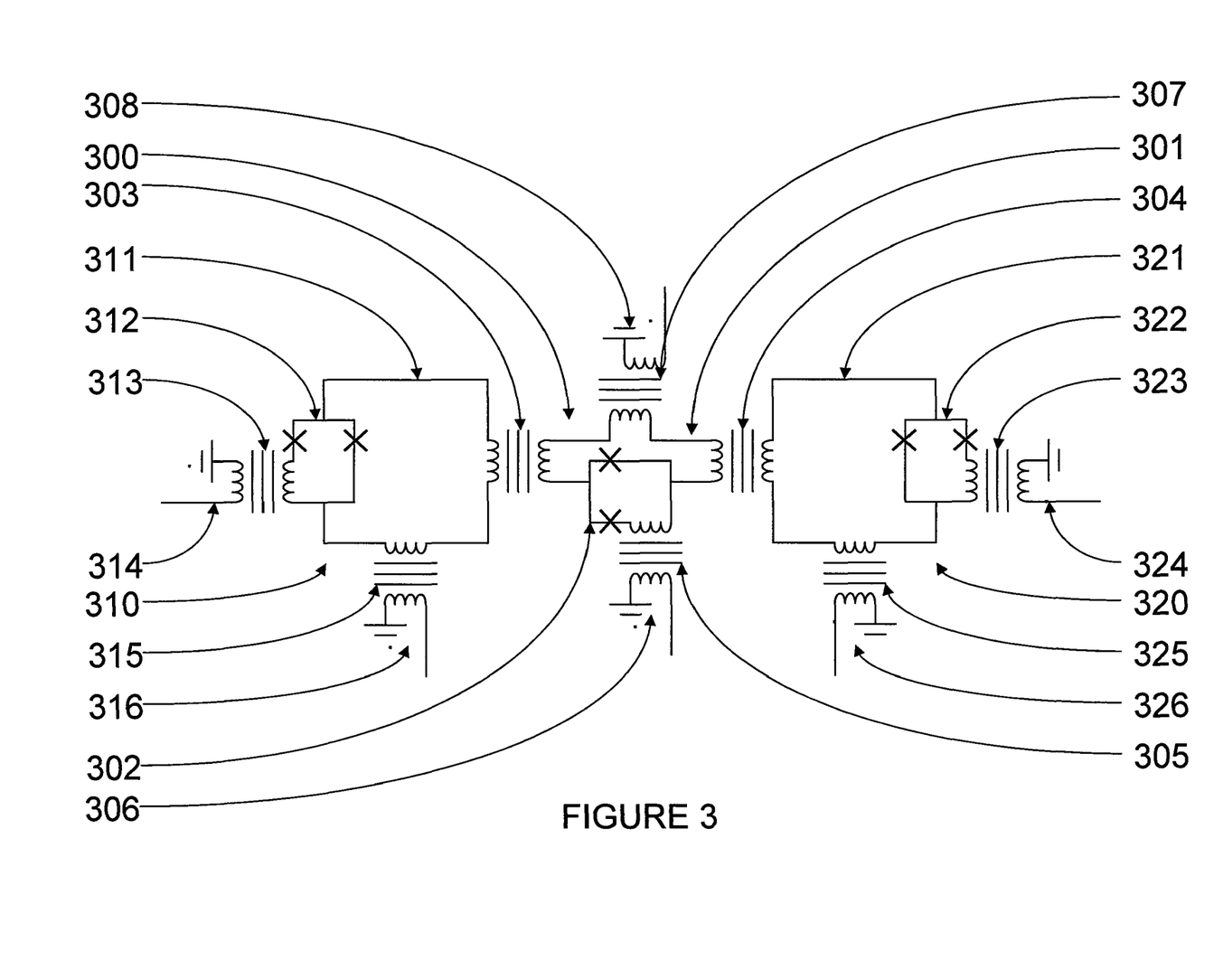
FIG. 3 is a schematic diagram of an embodiment of a superconducting controllable coupler system.

One embodiment of the present system, devices and methods is shown in the schematic diagram of FIG. 3. A controllable coupler 300 (i.e., a loop 301 of superconducting material interrupted by a compound Josephson junction 302, also known as an rf SQUID) is used to inductively couple a first qubit 310 and a second qubit 320. In some embodiments, qubit 310 and qubit 320 may be superconducting flux qubits. In this embodiment, qubit 310 is comprised of a loop 311 of superconducting material interrupted by a compound Josephson junction 312 and is coupled to controllable coupler 300 through a coupling structure through the exchange of flux 303 between coupler 300 and qubit 310. Loop 311 is threaded by flux 315 created by electrical current flowing through a magnetic flux inductor 316. Flux 315 controls the energy bias of qubit 310. Compound Josephson junction 312 is threaded by flux 313 created by electrical current flowing through a magnetic flux inductor 314. Flux 313 controls the transverse term $\Delta_1$ of qubit 310. Qubit 320 is comprised of a loop 321 of superconducting material interrupted by a compound Josephson junction 322 and is coupled to coupler 300 through a coupling structure by the exchange of flux 304 between coupler 300 and qubit 320. Loop 321 is threaded by flux 325 created by electrical current flowing through a magnetic flux inductor 326. Flux 325 controls the energy bias of qubit 320. Compound Josephson junction 322 is threaded by flux 323 created by electrical current flowing through a magnetic flux inductor 324. Flux 323 controls the transverse term $\Delta_2$ of qubit 320. Those of skill in the art appreciate other qubit superconducting flux qubit designs may be chosen and that the qubit design of qubit 310 may be of a different design than that of qubit 320. Compound Josephson junction 302 is threaded by flux 305 created by current flowing through a magnetic flux inductor 306. Flux 305 produced by the magnetic flux inductor 306 threads compound Josephson junction 302 of coupler 300 and controls the state of coupler 300. Loop 301 is threaded by flux 307 created by current flowing through a magnetic flux inductor 308. Flux 307 produced by the magnetic flux inductor 308 threads loop 301 of coupler 300. Coupling structures may be used to exchange magnetic flux between two structures such that the flux that is exchanged may cause a change in the state of at least one of the structures being coupled.

In one embodiment, coupler 300 is capable of producing an approximately zero coupling between qubit 310 and qubit 320. To produce an approximately zero coupling between qubit 310 and qubit 320, the amount of flux 305 threading compound Josephson junction 302 is adjusted to be about $(n+\frac{1}{2})\phi_0$, wherein n is an integer. In one embodiment, coupler 300 is capable of producing an anti-ferromagnetic coupling between qubit 310 and qubit 320. To produce such a coupling between qubit 310 and qubit 320, the amount of flux 305 threading compound Josephson junction 302 is adjusted to be about $(2n)\phi_0$, wherein n is an integer. In one embodiment, coupler 300 is capable of producing a ferromagnetic coupling between qubit 310 and qubit 320. To produce such a coupling between qubit 310 and qubit 320, the amount of flux 305 threading compound Josephson junction 302 is adjusted to be about $(2n+1)\phi_0$, wherein n is an integer. Those of skill in the art will appreciate that the amount of flux 305 threading compound Josephson junction 302 is a rough value and amounts of flux 305 threading compound Josephson junction 302 of similar amounts will produce similar coupling states.

In a further embodiment, coupler 300 is capable of producing transverse YY coupling interactions between qubit 310 and qubit 320 in the flux basis. To produce the YY coupling, coupler 300 is put into a non-adiabatic regime by reducing the energy difference between the ground state and first excited state of coupler 300. The YY term that is achieved may be proportional to $\Delta_1\Delta_2/\Omega_C^2$. The parameters $\Delta_1$ and $\Delta_2$ are the transverse terms of qubit 310 and qubit 320 respectively and are respectively controllable by adjusting the amount of flux 313 threading compound Josephson junction 312 and the amount of flux 323 threading compound Josephson junction 322. $\Omega_C$ is the energy difference between the ground state and first excited state of coupler 300. Those of skill in the art will appreciate that to achieve large YY coupling, a $\Omega_C$ of about the same order as $\sqrt{\Delta_1\Delta_2}$ may be needed. Therefore not only may a small energy splitting of the coupler be needed, but also finite $\Delta_1$ and $\Delta_2$ may be required. When only ZZ coupling is required, it may be possible to turn the YY coupling off by setting: $\Delta_1=\Delta_2=0$. When only YY coupling is required, it may be possible to tune the ZZ coupling to zero while keeping $\Delta_1$ and $\Delta_2$ finite.

Tuning compound junction 302 by adjusting the amount of flux 305 threading compound Josephson junction 302 to a small critical current will produce a coupler with $\beta_L<1$, as is traditionally done for ZZ coupling. By ensuring $\beta_L<1$, the energy gap between the two lowest energy levels of the coupler 300 will be large and therefore favor adiabatic couplings. $\beta_L$ may be represented as $2\pi L I_c/\Phi_0$, where L is the inductance of coupler 300, $I_c$ is the effective critical current of Josephson junction 302 where the effective critical current of Josephson junction of a coupler may be the critical current of a single Josephson junction or an effective critical current of a compound Josephson junction (such as compound Josephson junction 302), and $\Phi_0$ is the magnetic flux quantum. The effective critical current of a single Josephson junction is an inherent property of the single Josephson junction and is dependant upon physical dimensions and characteristics of the junction. The critical current of a single Josephson junction can be suppressed with a very strong magnetic field applied to the single Josephson junction. The effective critical current of a compound Josephson junction is also dependant upon the physical dimensions and characteristics of each junction of the compound Josephson junction, but the effective critical current may be carefully tuned by controlling the amount of flux threading the loop of superconducting material defining the compound junctions. If a YY coupling is desired, tuning of compound Josephson junction 302 can be done by adjusting the amount of flux 305 threading compound Josephson junction 302 to produce a regime where $\beta_L>1$. Coupler 300 may then becomes bistable, and splitting between the two lowest energy levels, the ground state and the first excited state of coupler 300 can be made as small as desired. Energy splitting between the two lowest energy levels inhibits transitions from the ground state to the first excited state resulting in an adiabatic ZZ coupler. By reducing energy splitting, virtual transitions may occur between the two states. Such transitions will produce higher orders in the adiabatic expansion. The first higher order coupling term is YY coupling. For further discussion of the adiabatic expansion, see e.g., Hutter et al., arXiv:cond-mat/0602086 (2006).

It may be desirable to keep parameters $\Delta_1$ and $\Delta_2$ in a regime where their values are finite by controllably adjusting the amount of flux 313 threading compound Josephson junction 312 and the amount of flux 323 threading compound Josephson junction 323 and tuning the parameters in such a way to achieve $\Omega_C \sim \sqrt{\Delta_1\Delta_2}$.

In contrast to couplers 100 and 200, the Hamiltonians which coupler 300 is capable of embedding allow for diagonalized ZZ and transverse Y coupling interactions (e.g., $\sigma_z^1\sigma_z^2$ interactions and $\sigma_y^1\sigma_y^2$ interactions). The Hamiltonian H for coupler 300 is:

$$H = \sum_{i=1,2}(h_i\sigma_z^i + \Delta_i\sigma_x^i) + J_{1,2}^{ZZ}\sigma_z^1\sigma_z^2 + J_{1,2}^{YY}\sigma_y^1\sigma_y^2,$$

where 1 and 2 represent qubit 310 and qubit 320 respectively, $h_1$ is the energy bias of qubit 310 and is controllable by adjusting the amount of flux 315 threading loop 311, $h_2$ is the energy bias of qubit 320 and is controllable by adjusting the amount of flux 325 threading loop 321, $\sigma_z^1$ is the z-Pauli matrix of qubit 310, $\sigma_z^2$ is the z-Pauli matrix of qubit 320, $J_{1,2}^{ZZ}$ is the diagonal coupling coefficient between qubit 310 and qubit 320 and is controllable by adjusting the amount of flux 305 threading compound Josephson junction 302, $\sigma_y^1$ is the y-Pauli matrix of qubit 310, $\sigma_y^2$ is the y-Pauli matrix of qubit 320, and $J_{1,2}^{YY}$ is the transverse coupling coefficient between qubit 310 and qubit 320 and is controllable by adjusting the amount of flux 305 threading compound Josephson junction 302. The parameters $\Delta_1$ and $\Delta_2$ are the flux tunneling amplitude terms of qubit 310 and qubit 320 respectively. The transverse terms, $\Delta_1$ and $\Delta_2$, are respectively controllable by adjusting the amount of flux 313 threading compound Josephson junction 312 and the amount of flux 323 threading compound Josephson junction 322.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to quantum computing algorithms or quantum computing systems, methods, and apparatus, not necessarily the exemplary quantum computing systems, methods, and apparatus generally described above.

For instance, the foregoing detailed description has set forth various embodiments of the devices and/or processes via the use of block diagrams, schematics, and examples.

Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, may be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, or as super-conducting integrated circuits, and that designing the circuitry and/or writing the code for the software and or firmware would be well within the skill of one of ordinary skill in the art in light of this disclosure.

In addition, those skilled in the art will appreciate that many or all of the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Pat. No. 6,838,694, U.S. Patent Publication No. 2005-0082519, US Patent Publication Number 2006-0225165, US Patent Publication No. 2008-0176750, U.S. Patent Publication Number 2006-0147154, and U.S. patent application Ser. No. 12/017,995 filed Jan. 22, 2008 and entitled "Systems, Devices, and Methods for Controllably Coupling Qubits" are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A coupling system comprising:
   an rf SQUID having a loop of superconducting material interrupted by a compound Josephson junction;
   a first magnetic flux inductor inductively coupled to the compound Josephson junction and capable of controlling a $\beta_L$ parameter of the coupling system;
   a second magnetic flux inductor inductively coupled to the loop of superconducting material;
   a first coupling structure coupling the rf SQUID to a first qubit; and
   a second coupling structure coupling the rf SQUID to a second qubit; and
   wherein the coupling system is operated such that the $\beta_L$ parameter is greater than 1.

2. The coupling system of claim 1 wherein at least one of the first qubit and the second qubit is a superconducting flux qubit.

3. The coupling system of claim 1 wherein the first magnetic flux inductor and the second magnetic flux inductor control a coupling state of the rf SQUID.

4. The coupling system of claim 3 wherein the coupling state of the rf SQUID is at least one of an anti-ferromagnetic coupling state, a ferromagnetic coupling state, a transverse coupling state and a zero coupling state.

5. The coupling system of claim 4 wherein the transverse coupling state is in a flux basis.

6. The coupling system of claim 1 wherein the $\beta_L$ parameter is controlled by adjusting an amount of flux produced by the first magnetic flux inductor.

7. A method of controllably coupling a first qubit to a second qubit using an rf SQUID having a loop of superconducting material interrupted by a compound Josephson junction, the method comprising:
   coupling the first qubit to the rf SQUID;
   coupling the second qubit to the rf SQUID;
   coupling a first magnetic flux inductor to the compound Josephson junction;
   coupling a second magnetic flux inductor to the loop or superconducting material;
   adjusting a first amount of flux, produced by the first magnetic flux inductor, threading the compound Josephson junction; and
   adjusting a second amount of flux, produced by the second magnetic flux inductor, that threads the loop of superconducting material such that the first qubit is transversely coupled to the second qubit.

8. The method of claim 7 wherein at least one of the first qubit and the second qubit is a superconducting flux qubit.

9. The method of claim 7 wherein coupling the first qubit to the rf SQUID comprises:
   threading magnetic flux produced by current flowing in the first qubit into the loop of superconducting material; and
   threading magnetic flux produced by current flowing in the loop of superconducting material into the first qubit.

10. The method of claim 7 wherein coupling the second qubit to the rf SQUID comprises:
    threading magnetic flux produced by current flowing in the second qubit into the loop of superconducting material; and
    threading magnetic flux produced by current flowing in the loop of superconducting material into the second qubit.

11. The method of claim 7 wherein coupling a first magnetic flux inductor to the compound Josephson junction comprises:
    threading magnetic flux produced by current flowing through the first magnetic flux inductor into the compound Josephson junction; and
    wherein coupling a second magnetic flux inductor to the loop of superconducting material comprises:
    threading magnetic flux produced by current flowing through the second magnetic flux inductor into the loop of superconducting material.

12. The method of claim 7 wherein adjusting the amount of flux, produced by the first magnetic flux inductor, threading the compound Josephson junction comprises at least one of passing more current through the first magnetic flux inductor or passing less current through the first magnetic flux inductor; and
    wherein adjusting the amount of flux, produced by the second magnetic flux inductor, threading the loop of superconducting material comprises at least one of passing more current through the second magnetic flux inductor or passing less current through the second magnetic flux inductor.

13. The method of claim 7 wherein adjusting the amount of flux, produced by the first magnetic flux inductor, threading the compound Josephson junction and adjusting the amount of flux, produced by the second magnetic flux inductor, threading the loop of superconducting material result in coupling the first qubit and the second qubit with at least one of an anti-ferromagnetic coupling, a ferromagnetic coupling, a transverse coupling and a zero coupling.

14. The method of claim 7 wherein the first qubit is transversely coupled to the second qubit in a flux basis.

15. A coupling system comprising:
an rf SQUID having a loop of superconducting material interrupted by a compound Josephson junction and a $\beta_L$ parameter;
a first magnetic flux inductor configured to selectively provide a first magnetic flux inductor mutual inductance coupling the first magnetic flux inductor to the compound Josephson junction, wherein the first magnetic flux inductor adjusts the $\beta_L$ parameter to be greater than one; and
a second magnetic flux inductor configured to selectively provide a second magnetic flux inductor mutual inductance coupling the second magnetic flux inductor to the loop or superconducting material, wherein the loop of superconducting material is positioned with respect to a first qubit to provide a first mutual inductance coupling the rf SQUID to the first qubit, and wherein the loop of superconducting material is positioned with respect to a second qubit to provide a second mutual inductance coupling rf SQUID to the second qubit.

16. A superconducting processor comprising:
a first qubit;
a second qubit;
an rf SQUID having a loop of superconducting material interrupted by a compound Josephson junction and a $\beta_L$ parameter;
a first magnetic flux means for selectively providing inductance coupling the first magnetic flux means to the compound Josephson junction, wherein the first magnetic flux means adjusts the $\beta_L$ parameter to be greater than one; and
a second magnetic flux means for selectively providing inductance coupling the second magnetic flux means to the loop of superconducting material, wherein the loop of superconducting material is configured to provide a first mutual inductance coupling the rf SQUID to the first qubit and to provide a second mutual inductance coupling the rf SQUID to the second qubit.

17. The superconducting processor of claim 16 wherein at least one of the first qubit and the second qubit is a superconducting flux qubit.

18. The superconducting processor of claim 16 wherein the first magnetic flux means includes a first magnetic flux inductor configured to selectively provide a third mutual inductance coupling the first magnetic flux inductor to the compound Josephson junction.

19. The superconducting processor of claim 16 wherein the second magnetic flux means includes a second magnetic flux inductor configured to selectively provide a fourth mutual inductance coupling the second magnetic flux inductor to the loop of superconducting material.

20. A method of controllably coupling a first qubit to a second qubit using an rf SQUID having a loop of superconducting material interrupted by a compound Josephson junction and a $\beta_L$ parameter, the method comprising:
coupling the first qubit to the rf SQUID;
coupling the second qubit to the rf SQUID;
coupling a first magnetic flux inductor to the compound Josephson junction;
coupling a second magnetic flux inductor to the loop or superconducting material;
adjusting a first amount of flux, produced by the second magnetic flux inductor, threading the compound Josephson junction, wherein the first amount of flux adjusts the $\beta_L$ parameter to be greater than one; and
adjusting a second amount of flux, produced by the second magnetic flux inductor, threading the loop of superconducting material.

21. The method of claim 20 wherein at least one of the first qubit and the second qubit is a superconducting flux qubit.

22. The method of claim 20 wherein coupling the first qubit to the rf SQUID comprises:
threading magnetic flux produced by current flowing in the first qubit into the loop of superconducting material; and
threading magnetic flux produced by current flowing in the loop of superconducting material into the first qubit.

23. The method of claim 20 wherein coupling the second qubit to the rf SQUID comprises:
threading magnetic flux produced by current flowing in the second qubit into the loop of superconducting material; and
threading magnetic flux produced by current flowing in the loop of superconducting material into the second qubit.

24. The method of claim 20 wherein coupling a first magnetic flux inductor to the compound Josephson junction comprises:
threading magnetic flux produced by current flowing through the first magnetic flux inductor into the compound Josephson junction; and
wherein coupling a second magnetic flux inductor to the loop of superconducting material comprises:
threading magnetic flux produced by current flowing through the second magnetic flux inductor into the loop of superconducting material.

25. The method of claim 20 wherein adjusting the amount of flux, produced by the first magnetic flux inductor, threading the compound Josephson junction comprises at least one of passing more current through the first magnetic flux inductor or passing less current through the first magnetic flux inductor; and
wherein adjusting the amount of flux, produced by the second magnetic flux inductor, threading the loop of superconducting material comprises at least one of passing more current through the second magnetic flux inductor or passing less current through the second magnetic flux inductor.

26. The method of claim 20 wherein adjusting the amount of flux, produced by the first magnetic flux inductor, threading the compound Josephson junction and adjusting the amount of flux, produced by the second magnetic flux inductor, threading the loop of superconducting material result in coupling the first qubit and the second qubit with at least one of an anti-ferromagnetic coupling, a ferromagnetic coupling, a transverse coupling and a zero coupling.

27. The method of claim 20 wherein the transverse coupling is in a flux basis.

* * * * *